3,449,653
CIRCUIT ARRANGEMENT FOR COMPENSATING REACTIVE LOADS
Floris Koppelmann, Berlin, Germany, assignor to Licentia Patent-Verwaltungs-G.m.b.H., Frankfurt am Main, Germany
Filed May 6, 1966, Ser. No. 548,289
Claims priority, application Germany, May 6, 1965, L 50,651
Int. Cl. H02p 1/26, 5/38
U.S. Cl. 318—227                                    10 Claims

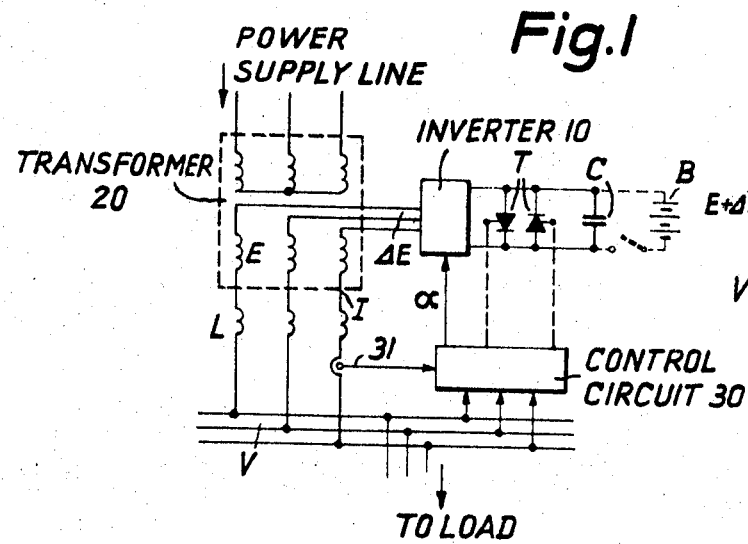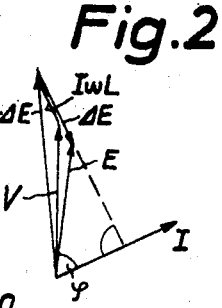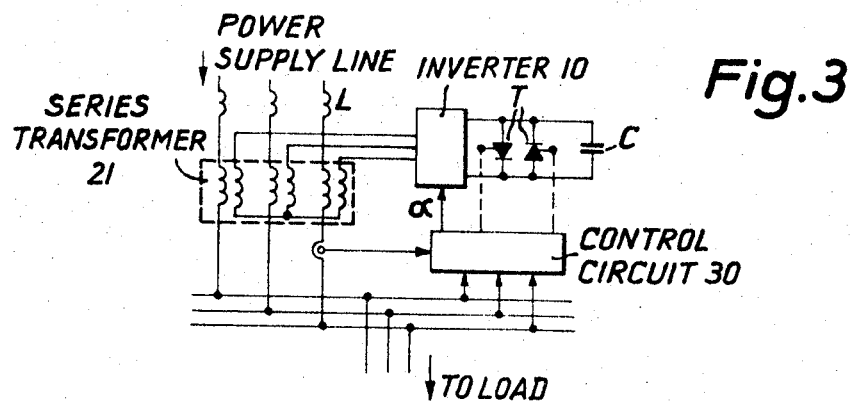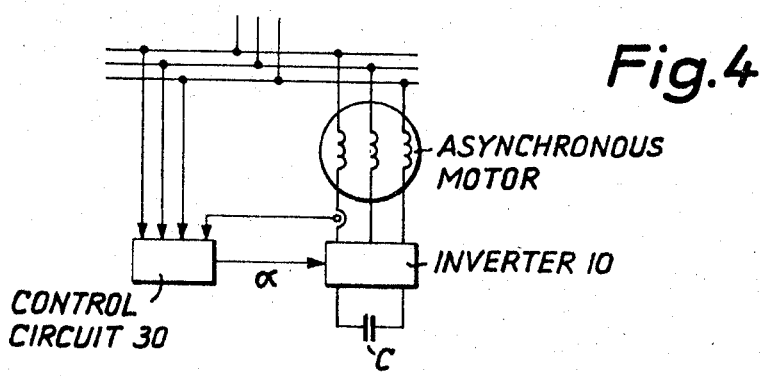
Inventor:
Floris Koppelmann
By: Spencer & Kaye
Attorneys United States Patent Office 3,449,653
Patented June 10, 1969

ABSTRACT OF THE DISCLOSURE

A circuit arrangement for compensating a reactive load connected to a power line. The circuit includes a controllable inverter having A.C. and D.C. terminals. The A.C. terminals are connected in series with either the power line or the load voltage line and the D.C. terminals are connected to a reactive circuit element such as a capacitor. The circuit further includes a control circuit to effect the forced commutation of the inverter so that the inverter and the reactive circuit element will provide a reactive voltage.

The present invention relates to a reactive current inverter which is connected in series with a net or line voltage.

There exist current inverter able to put out reactive current which is purely inductive or purely capacitative. Particularly suitable for this purpose are current inverters which are connected as a three-phase bridge circuit incorporating a buffer capacitor on the direct current (D.C.) side. If such inverters are connected in parallel with an inductive load, they can deliver the inductive current to this load and thereby relieve the line from this current.

A similar effect can be obtained if, in accordance with the present invention, such inverters are connected in series with the line voltage, or with the load voltage. The inverters will then deliver an inductive voltage which will compensate the voltage drop of inductive loads at reactances present in the line. The present invention is particularly suited for automatically stabilizing line voltages, in which case the arrangement acts as conventional series capacitors. However, the arrangement according to the present invention has the advantage over such capacitors—and this is the primary object of the present invention—that the inductive voltage introduced into the current circuit is contactlessly, continuously and quickly regulatable by controlling the firing time of the rectifier elements.

Thus, the present invention resides, basically, in an inverter arrangement incorporating an inverter with forced commutation, i.e., a controlled inverter, for putting out inductive current (voltage), which inverter is connected in series with the line voltage or the load voltage. The invention is especially applicable to a three-phase bridge circuit connection which incorporates a buffer capacitor on the D.C. side.

Addition objects and advantages of the present invention will become apparent upon consideration of the following description when taken in conjunction with the accompanying drawings in which:

FIGURE 1 is a cricuit diagram of one embodiment of the present invention.

FIGURE 2 is a vector diagram showing the current and voltage relationship under certain operating conditions.

FIGURE 3 is a circuit diagram of another embodiment of the present invention.

FIGURE 4 is a circuit diagram of still another embodiment of the present invention.

Referring now to the drawings and first to FIGURE 1 thereof, the same shows an inverter 10 connected to the neutral point of a transformer 20 which supplies a load circuit with a voltage V. The inverter 10 is controlled by a control circuit 30 which has a pick-up 31 in one of the secondary lines of the transformer and which controls the instants (angle $\alpha$) at which the rectifier elements (e.g., thyristors), are fired, thereby to render these elements conductive at the proper times to produce the requisite forced commutation. In this way, the inverter 10 compensates more or less fully the voltage drop of the load at the reactances L; under certain circumstances, the voltage drop at the reactance on the primary of the transformer is also compensated.

For the inverter 10 and control circuit 30, reference is made to the issue of "AEG-Mitteilungen" 54, 1964, volume 1/2, pages 90–91, FIG. 6 and pages 95–100 and to the application Ser. No. 527,427, Koppelmann, assignor to Licentia Patent-Verwaltungs-G.m.b.H., filed Feb. 15, 1966. Pertinent portions of the former reference have been made of record in the file of this patent.

FIGURE 2 is a vector diagram showing this compensation for the case where the voltage $\Delta E$ of the inverter is somewhat greater than the voltage drop $I\omega L$. In this case, and if the line voltage V is constant, the transformer secondary voltage E, with fluctuating load, need not be varied or varied only a little. The firing angle $\alpha$ can be regulated in such a manner that, with fluctuating load, the line voltage V remains constant. Should a short circuit appear in the load circuit, the inverter current and therefore the A.C. voltage component of the capacitor $C_0$ becomes so large that the elements of the inverter are endangered. In that case, the inverter can be quickly short-circuited on the A.C. side, or, as shown in FIGURE 1, on the D.C. side, for example by means of antiparallel thyristors T.

If a D.C. voltage source B, for example a buffer battery or a fuel cell battery, is connected in parallel with the capacitor $C_0$, the inverter is able to compensate not only reactive current pulses but also non-reactive current pulses and thus to relieve the supply line from those pulses while maintaining the voltage V substantially constant.

FIGURE 3 shows the inverter as being incorporated in the load circuit, with the help of a series transformer 21.

FIGURE 4 shows the inverter connected, in accordance with the present invention, at the neutral point of a load, for example an asynchronous motor. Such an arrangement allows the asynchronous motor to be operated with a good slip factor cos $\varphi$ at all times, even during starting.

If the control circuit 30 for the inverter is so designed that capacitive current can be put out, the inverter can, in accordance with the present invention, be connected in series with a cable network. If inductive current is delivered, an inverter according to the present invention can be used to compensate long open-air transmission lines.

The type rating of the inverter depends on the magnitude of the voltage $\Delta E$ which it is to put out. In normal cases, where the inductive voltage drops are about 10%, the inverter need to be designed for only 10% of the line voltage, i.e., for a 10 kv. net, it need be designed for 1000 v.

Since inverters produce not only fundamentals but also harmonics, it is best if, in an inverter according to the present invention the inverter voltage $\Delta E$ is small as compared to the line voltage, because in that case the voltage of the harmonics of the inverter is small as compared to the line voltage so that no filters, or at most small filters, will be needed.

It will be understood that the above description of the present invention is susceptible to various modifications, changes, and adaptations, and the same are intended to be comprehended within the meaning and range of equivalents of the appended claims.

What is claimed is:
1. A circuit arrangement comprising, in combination:
   (a) means forming a supply voltage line;
   (b) means forming a load voltage line and connected to said supply voltage line;
   (c) controllable inverter means having a D.C. side connected to a reactive circuit element and an A.C. side connected in series with one of said lines; and
   (d) a control circuit connected to commutate said inverter means for causing the same to put out a reactive voltage.

2. An arrangement as defined in claim 1 wherein said inverter means include, on the D.C. side, a buffer capacitor.

3. An arrangement is defined in claim 2 wherein said inverter means further includes a battery connected across the D.C. side.

4. An arrangement as defined in claim 1 wherein said inverter means are connected in series with said supply voltage line.

5. An arrangement as defined in claim 1 wherein said inverter means are connected in series with said load voltage line.

6. An arrangement as defined in claim 1 wherein said lines and said converter means are three-phase circuits.

7. An arrangement as defined in claim 6 wherein said inverter means are connected to the neutral point of the load circuit.

8. An arrangement as defined in claim 7 wherein the load is an asynchronous motor.

9. An arrangement as defined in claim 1 wherein said reactive voltage is an inductive voltage.

10. An arrangement as defined in claim 1 wherein said reactive voltage is a capacitative voltage.

References Cited
UNITED STATES PATENTS

| | | | |
|---|---|---|---|
| 3,336,520 | 8/1967 | Miyairi et al. | 321—5 |
| 3,340,453 | 9/1967 | Bradley et al. | 321—5 |

ORIS L. RADER, *Primary Examiner.*

G. Z. RUBINSON, *Primary Examiner.*

U.S. Cl. X.R.

307—104; 318—230; 321—5